United States Patent Office 3,249,173
Patented May 3, 1966

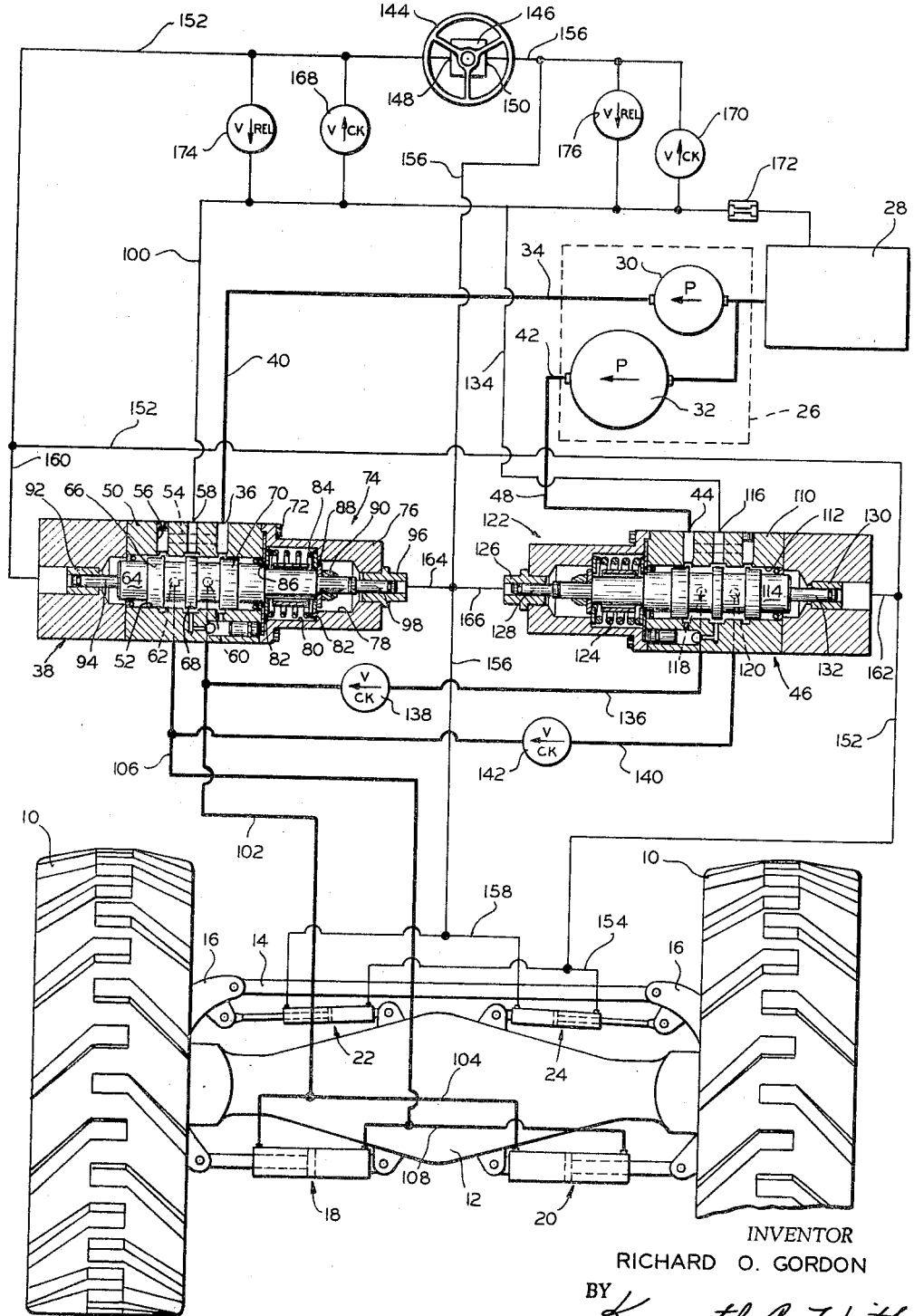

---

3,249,173
POWER STEERING SYSTEM
Richard O. Gordon, New Buffalo, Mich., assignor to Clark Equipment Company, a corporation of Michigan
Filed Dec. 20, 1963, Ser. No. 332,172
5 Claims. (Cl. 180—79.2)

This invention relates to power steering systems, and more specifically to multi-speed power steering systems suitable for use with road graders, heavy duty vehicles such as tractor scrapers and the like.

In road graders and tractor scrapers of the type used for road construction it is highly desirable to have a power steering system that automatically provides a low steering speed for minor vehicle direction changes and a high steering speed for major vehicle direction changes. The minor vehicle direction changes generally are made when the vehicle is traveling at a relatively high rate of speed, and so a slow steering speed is needed in order to prevent over steering with its attendant safety hazards. On the other hand the major vehicle direction changes are made at low vehicle speeds, and therefore a high steering speed is required in order to provide a rapidly maneuverable vehicle. Power steering systems having two or more steering speeds are known, but heretofore have involved the use of expensive and complex control valves or presented other drawback such as being difficult to adjust and/or keep in adjustment. A further drawback is that the previous multi-speed power steering systems generally do not readily permit changing the point at which the steering speeds are changed.

One of the main objects of my invention is to provide a multi-speed power steering system which is simple, low cost and easy to adjust.

Another object of my invention is to provide a multi-speed power steering system in which the point that the low steering speed shifts to the high steering speed is easily changed.

A feature of my invention is that additional steering speeds can be added simply by adding to the system the circuitry and component parts for each steering speed.

In carrying out my invention in a preferred embodiment there is provided a dual pump having a low volume capacity unit and a high volume capacity unit. The low volume capacity unit is connected to a first control valve which directs fluid either to a reservoir or to fluid motor means for steering the associated vehicle. The high volume capacity unit is connected to a second control valve which directs fluid either to the reservoir or the afore-mentioned fluid motor means. The two valves are connected jointly to a reversible pump which is connected to a steering control wheel so that rotation of the steering control wheel causes the pump to generate pressurized fluid which serves to actuate the two valves to direct fluid to the fluid motor means. The first valve requires a relatively low force to actuate it to direct fluid to the fluid motor means and the second valve requires a relatively high force to actuate it to direct fluid to the fluid motor means with the result that initial rotation of the steering control wheel causes the first valve to direct a relatively low volume of pressure fluid to the fluid motor means and further rotation of the steering control wheel causes the second valve to add a relatively high volume of pressure fluid to the fluid already flowing to the fluid motor means.

The above and other objects, features and advantages of my invention will become more readily apparent to persons skilled in the art when the following detailed description is taken in conjunction with the accompanying drawing which depicts diagrammatically my invention.

Referring to the drawing, my multi-speed power steering system is shown associated with the pair of dirigible wheels 10, although it could just as well be associated with an articulated vehicle. The dirigible wheel 10 are mounted for pivotal movement about substantially vertical steering axes at the ends of an axle 12. A tie rod 14 is pivotally connected to a pair of brackets 16, as shown, and serves to interconnect wheel 10. A pair of double-acting piston and cylinder type fluid motors 18 and 20 are connected respectively between axle 12 and one of dirigible wheels 10, as shown. Fluid motors 18 and 20, of course, are a part of the power steering system and are coordinated to pivot dirigible wheel 10 about their steering axes in one direction or the other in order to steer the associated vehicle. While a pair of double-acting piston and cylinder type fluid motors have been shown, it will be understood that, depending upon the requirements of the vehicle, a single fluid motor of this type could be used or with suitable modification a pair of single-acting piston and cylinder type fluid motors could be used to pivot the wheels 10 about their steering axes, or for that matter a rotary type fluid motor could be used. Also connected respectively between axle 12 and one of dirigible wheels 10 is another pair of double-acting piston and cylinder type fluid motors 22 and 24. These fluid motors 22 and 24 serve to provide a hydraulic follow-up for the power steering system as will be explained more fully shortly and under emergency conditions provide manual steering of the dirigible wheels 10.

The power steering system includes, in addition to the above-described fluid motors, a dual pump 26 which is connected to and draws fluid from a reservoir or sump 28. Pump 26 which serves as a source of pressurized fluid for the power steering system includes a relatively low fluid volume capacity unit 30 and a relatively high fluid volume capacity unit 32. While I prefer to use a dual pump connected to the vehicle prime mover, it will be appreciated that a pair of single pumps could be used, if desired. The outlet port 34 of low volume unit 30 is connected to the inlet port 36 of a fluid control valve 38 by means of a conduit 40. Similarly, outlet port 42 of high volume unit 32 is connected to the inlet port 44 of a fluid control valve 46 by means of a conduit 48.

Valves 38 and 46 are four-way open-center valves that serve to direct pressure fluid from low volume unit 30 and high volume unit 32, respectively, either to reservoir 28 or fluid motors 18 and 20 as will be explained more fully hereinbelow. Valve 38 includes a housing or body 50 with a bore 52 therein. Disposed in housing 50 and communicating with bore 52 is inlet port 36 and connecting passages 54 and 56, an outlet port 58 and fluid motor ports 60 and 62. Slidably disposed in bore 52 is a spool 64 having three spaced-apart annular lands 66, 68 and 70 thereon. When spool 64 is in the centered position shown the valve 38 is in a first operating condition directing fluid from unit 30 to reservoir 28 and when spool 64 is shifted in either direction away from the centered position the valve 38 is in a second operating condition directing fluid from unit 30 to motors 18 and 20.

Attached to one end of housing 50 by any suitable means such as machine screws 72 is a spool centering assembly 74 which serves as means for maintaining spool 64 in its centered position, as shown, and requiring a predetermined force to shift spool 64 in either direction away from its centered position. Assembly 74 includes a housing 76 having a bore 78 and counterbore 80 therein. A pair of washers 82 are disposed in counterbore 80 and encircle a portion of spool 64. Washers 82 are biased apart by means of a helical compression spring 84. One of washers 82 engages a shoulder 86 on spool 64 and the other of washers 82 engages an annular member 88 fixed to spool 64 by means of a nut 90. At this point it will be clear that movement of spool 64 in either direction away from the position shown tends to cause compression of spring 84, thereby requiring a predetermined force to overcome the bias of spring 84 and shift spool 64. Also, when the force that is applied to spool 64 is released the spring 84 will cause spool 64 to return to the position shown.

The valve 38 includes a piston and cylinder actuator 92 having a piston 94 which abuts one end of spool 64 and a piston and cylinder actuator 96 having a piston 98 which abuts the other end of spool 64. These actuators function to shift spool 64 from its centered position as will be explained more fully later.

The outlet port 58 of spool 38 is connected to reservoir 28 by means of a conduit 100. Fluid motor port 60 is connected by means of a conduit 102 to a cross conduit 104 which connects the rod end of motor 18 with the head end of motor 20. In a similar manner fluid motor port 62 is connected by means of a conduit 106 with a cross conduit 108 which connects the head end of motor 18 with the rod end of motor 20.

The valve 46 is structurally identical with valve 38, and so will not be described in as great detail. Valve 46 includes a housing or body 110 with a bore 112 therein within which a spool 114 is slidably disposed. Disposed in housing 110 and communicating with bore 112, in addition to inlet port 44, are an outlet port 116, a fluid motor port 118 and a fluid motor port 120. When spool 114 is in the centered position shown the valve 46 is in a first operating condition directing fluid from unit 32 to reservoir 28 and when spool 114 is shifted in either direction away from the centered position the valve 46 is in a second operating condition directing fluid from unit 32 to motors 18 and 20. Attached to housing 110 is a spool centering assembly 122 which is identical with spool centering assembly 74, except that spring 124 is heavier than spring 84. That is, spring 124 requires a greater force to compress it than spring 84. Consequently, a greater force is required to shift spool 114 away from its centered position than is required to shift spool 64 away from its centered position.

Valve 46 also includes a piston and cylinder actuator 126 having a piston 128 which abuts one end of spool 114 and a piston and cylinder actuator 130 having a piston 132 which abuts the other end of spool 114. The actuator 126 and 130 serves to shift spool 114 in either direction away from its centered position, as shown.

Outlet port 116 of spool 46 communicates with reservoir 28 by means of a conduit 134 which connects with conduit 100. Fluid motor port 118 communicates with motors 18 and 20 by means of a conduit 136 which connects with conduit 102. It will be noted that a one-way check valve 138 is disposed in conduit 136 and prevents fluid flow from conduit 102 toward fluid motor port 118. Fluid motor port 120 communicates with fluid motors 18 and 20 by means of a conduit 140 which connects with conduit 106. A check valve 142 is disposed in conduit 140 to prevent fluid flow from conduit 106 toward fluid motor port 120.

Valves 38 and 46 have been described to the extent considered necessary for an understanding of the present invention; however, if a further detailed explanation or description of these valves is desired then reference should be had to my co-pending continuation-in-part application, Serial No. 315,118, filed October 4, 1963, now Patent No. 3,176,721, which is assigned to the same assignee as the present invention.

An operator's steering control wheel 144 is connected to a reversible positive displacement type pump 146 having a pair of ports 148 and 150. Steering wheel 144 is connected to pump 146 so that counterclockwise rotation of wheel 144 causes pressure fluid to be generated by pump 146 and forced out of port 148 and clockwise rotation of wheel 144 causes pressure fluid to be forced out of port 150. A conduit 152 is connected at one end to port 148 and is connected at the other end to a cross conduit 154 which connects the head end of follow-up motor 22 with the rod end of follow-up motor 24. Similarly a conduit 156 is connected to port 150 at one end and is connected at the other end to a conduit 158 which communicates the rod end of follow-up motor 22 with the head end of follow-up motor 24. Conduit 152 is in communication with piston and cylinder actuator 92 via a conduit 160 and piston and cylinder actuator 130 via a conduit 162. Similarly conduit 156 is in communication with piston and cylinder actuator 96 via a conduit 164 and with piston and cylinder actuator 126 via conduit 166.

Pump 146, conduits 152 and 156 and follow-up motors 22 and 24 are maintained full of fluid by means of a one-way check valve 168 connected between conduits 100 and 152 and a one-way check valve 170 connected between conduits 100 and 156. Valves 168 and 170 permit fluid to flow into conduits 152 and 156, respectively, when needed. An orifice 172 is disposed in conduit 100 downstream of valves 168 and 170 in order to provide a sufficient back pressure to cause fluid flow from conduit 100 to conduits 152 and 156. In order to provide for the relief of excessive pressures generated in conduits 152 and 156 a relief valve 174 is disposed between conduit 152 and conduit 100 and a relief valve 176 is disposed between conduit 156 and conduit 100.

Turning now to a description of the operation of my multi-speed power steering system, it will be assumed that the power steering system is associated with a vehicle moving forwardly or upwardly as viewed in the drawing and that it is desired to execute a turn toward the left which would require the dirigible wheels 10 to pivot in a counterclockwise direction as viewed in the drawing. The operator of the vehicle will turn steering control wheel 144 in a counterclockwise direction, thereby forcing pressure fluid out of port 148 and drawing fluid in through port 150. This has the effect of increasing the fluid pressure acting on the left end of spool 64 and decreasing the fluid pressure acting on the right end of spool 64 so that there is a differential fluid pressure acting on spool 64. The result is that a force is applied to the left end of spool 64 which tends to shift it toward the right as viewed in the drawing. Similarly, the same force will be applied to the right end of spool 114 and tend to shift it toward the left as viewed in the drawing. When the force due to the pressure fluid generated through turning wheel 144 is sufficiently high enough to overcome the bias of spring 84 holding spool 64 in its centered position the spool will shift toward the right with the result that pressure fluid from the low volume capacity unit 30 will be directed to fluid motor port 60 and hence to the rod end of fluid motor 18 and head end of fluid motor 20. The result is that dirigible wheels 10 begin to pivot in a counterclockwise direction. When wheels 10 begin to pivot in a counterclockwise direction this causes follow-up motor 22 to extend and follow-up motor 24 to retract so that the fluid pressure differential applied to the ends of spools 64 and 114 tends to be equalized. Thus, a hydraulic follow-up is provided. That is, it is necessary to continue turning wheel 144 for continued turning of dirigible wheels 10. As soon as the operator stops turning the steering control wheel 144 the dirigible wheels 10 "catch up" and due to the follow-up cylinders 22 and 24 and their connection to valves 38 and 46 return the spools 64 and 114 to their centered positions. It will be obvious at this point that a predetermined rate of turning of steering control wheel 144 in a counterclockwise direction connects low volume unit 30 to fluid motors 18 and 20 to cause dirigible wheels 10 to pivot in a counterclockwise direction at a relatively slow steering speed. Now, if it is desired to pivot wheels 10 counterclockwise at a relatively high steering speed, then the operator merely increases the rate at which he turns steering control wheel 144 in a counterclockwise direction. By increasing the rate at which steering control wheel 144 is turned the rate of fluid flow from port 148 is increased so that a higher fluid pressure can be generated in conduit 152. When the fluid pressure in conduit 152 is sufficiently high enough to provide the force at the right end of spool 114 which is necessary to overcome the bias of spring 124 the spool 114 will shift toward the left, whereby the output from the relatively high volume unit 32 is directed to fluid motor port 118 and hence to fluid motors 18 and 22 via conduits 136, 102 and 104. When this occurs the fluid output of both units 30 and 32 is being supplied to fluid motors 18 and 20 with the result that dirigible wheels 10 will pivot in a counterclockwise direction at a faster rate than when only the output from unit 30 is being supplied to fluid motors 18 and 20.

If it is desired to steer the vehicle toward the right, that is, pivot dirigible wheels 10 in a clockwise direction, it is merely necessary for the operator to rotate steering control wheel 144 in a clockwise direction so that pressure fluid is forced out of port 150 of pump 146. As a result, the fluid pressure generated thereby tends to cause spool 64 to shift toward the left and spool 114 to shift toward the right so that low volume unit 30 is connected to fluid motor port 62 and hence with head end of fluid motor 18 and the rod end of fluid motor 20 via conduits 106 and 108. Similarly, rightward shifting of spool 114 connects high volume unit 32 with fluid motor port 120 and hence with conduit 106 via conduit 140.

While I have described my invention in a single preferred embodiment, it should be understood that this description is intended to be illustrative only and that various modifications and changes can be made thereto without departing from the scope and spirit of my invention. For example, the hydraulic follow-up can be eliminated from the power steering system in which case the degree of rotation of the steering control wheel rather than the rate of rotation of steering control wheel will determine when the power steering system shifts from low speed steering to high speed steering. Also, four-way valves of types other than the spool valves shown in the present power steering system are suitable for use therein. Consequently, the limits of my invention should be determined from the appended claims taken in view of the prior art.

I claim:

1. A power steering system comprising a fluid motor, a fluid reservoir, a low volume source of pressurized fluid connected to the said reservoir, a high volume source of pressurized fluid connected to the said reservoir, a first fluid control valve connected to the said reservoir, low volume source of pressure fluid and fluid motor for directing fluid from the said low volume source either to the said reservoir or motor, the said first valve including a housing, a bore in the said housing, a spool slidably disposed in the said bore for directing fluid flowing through the said first valve to the said reservoir when the said spool is in a centered position and to the said motor when the said spool is shifted away from the said centered position and means tending to maintain the said spool in the said centered position and requiring a predetermined force to shift the said spool away from the said centered position, a second fluid control valve connected to the said reservoir, high volume source of pressure fluid and fluid motor for directing fluid from the said high volume source either to the said reservoir or motor, the said second valve including a housing, a bore in the said housing, a spool slidably disposed in the said bore for directing fluid flowing through the said second valve to the said reservoir when the said second valve spool is in a centered position and to the said motor when the said second valve spool is shifted away from its centered position and means tending to maintain the said second valve spool in its centered position and requiring a predetermined force different than the first-mentioned predetermined force to shift the said second valve spool away from its centered position, and operator controlled differential pressure means connected to the said spools for shifting them away from their respective centered position.

2. A power steering system comprising fluid motor means, a fluid reservoir, a low volume source of pressure fluid connected to the said reservoir, a high volume source of pressure fluid connected to the said reservoir, a first control valve connected to the said reservoir, low volume source of pressure fluid and motor means, the said first valve directing fluid to the said reservoir in a first operating condition and directing fluid to the said motor means in a second operating condition, means tending to maintain the said first valve in its first operating condition and requiring a predetermined force to actuate the said first valve to its second operating condition, a second control valve connected to the said reservoir, high volume source of pressure fluid and motor means, the said second valve directing fluid to the said reservoir in a first operating condition and directing fluid to the said motor means in a second operating condition, means tending to maintain the said second valve in its first operating condition and requiring a predetermined force different than the first-mentioned predetermined force to actuate the said second valve to its second operating condition, and operator controlled fluid pressure means connected to the said valves for actuating them to their respective second operating condition.

3. A multi-speed power steering system comprising fluid motor means, a fluid reservoir, a source of pressure fluid having a low fluid flow capacity, a source of pressure fluid having a high fluid flow capacity, both sources of pressure fluide being connected to the said reservoir to draw fluid therefrom, a first fluid flow control valve connected to the said reservoir, motor means and low flow capacity pressure fluid source, the said first valve directing pressure fluid to the said reservoir in a first operating condition and directing pressure fluid to the said motor means in a second operating condition, means tending to maintain the said first valve in its first operating condition and requiring a predetermined force to actuate the said first valve to its second operating condition, a second fluid control valve connected to the said reservoir, motor means and high flow capacity pressure fluid source, the said second valve directing pressure fluid to the said reservoir in a first operating condition and directing pressure fluid to the said motor means in a second operating condition, means tending to maintain the said second valve in its first operating condition and requiring a predetermined force greater than the above-mentioned predetermined force to actuate the said second valve to its second operating condition, and operator controlled pressure fluid means connected jointly to both valves for actuating the said valves to their respective second operating conditions so that either the fluid flow from the said low capacity source or the sum of the fluid flows from the said low and high capacity sources can be directed to the said motor means.

4. A multi-speed power steering system comprising fluid motor means, a fluid reservoir, a source of pressure fluid connected to the said reservoir and having a low volume fluid outlet and a high volume fluid flow outlet, a first fluid flow control valve connected to the said reservoir, low volume fluid flow outlet and motor means, the said first valve directing pressure fluid to the said reservoir in a first operating condition and directing pressure fluid to the said motor means in a second operating condition, means tending to maintain the said first valve in its first operating condition and requiring a first predetermined force to actuate the said first valve to its second operating condition, a second fluid control valve connected to the said reservoir, high volume fluid flow outlet and motor means, the said second valve directing pressure fluid to the said reservoir in a first operating condition and directing pressure fluid to the said motor means in a second operating condition, means tending to maintain the said second valve in its first operating condition and requiring a second predetermined force greater than the said first predetermined force to actuate the said second valve to its second operating condition, a steering control wheel, a fluid pump connected to the said steering control wheel so that rotation of the said steering control wheel causes the said pump to generate pressure fluid, the said pump also being connected jointly to the said valves to supply pressure fluid to them for actuating them to their respective second operating conditions.

5. For use with dirigible wheel means, a multi-speed power steering system comprising at least one fluid motor connected to the dirigible wheel means for varying the steering angle of the dirigible wheel means, a fluid sump, a dual fluid pump connected to the said sump to draw fluid therefrom, the said pump having a low volume fluid flow outlet and a high volume fluid flow outlet, a first fluid flow control valve connected to the said low volume fluid flow outlet, sump and motor, the said first valve including a housing, a bore in the said housing and a spool slidably disposed in the said bore, the said first valve directing fluid from the said low volume fluid flow outlet to the said sump when the said spool is in a centered position and directing fluid from the said low volume fluid flow outlet to the said motor when the said spool is shifted in either direction away from its centered position, means tending to maintain the said spool in its centered position and requiring a first predetermined force to actuate the said spool in either direction away from its centered position, a second fluid flow control valve connected to the said high volume first valve directing fluid from the said low volume fluid including a housing, a bore in the said housing and spool slidably disposed in the said bore, the said second valve directing fluid from the said high volume fluid flow outlet to the said sump when the said second valve spool is in a centered position and directing fluid from the said high volume fluid flow outlet to the said motor when the said second valve spool is shifted in either direction away from its centered position, means tending to maintain the said second valve spool in its centered position and requiring a second predetermined force greater than the said first predetermined force to actuate the said second valve spool in either direction away from its centered position, a steering control wheel, a reversible pump having first and second ports, the said reversible pump being connected to the said steering control wheel so that rotation of the said steering control wheel in one direction causes the said reversible pump to draw fluid in through the said first port and discharge fluid from the said second port and rotation of the said steering control wheel in the other direction causes the reversible pump to draw fluid into the said second port and discharge fluid from the said first port, first fluid conduit means for connecting the said first port with one end of each of the said spools, second fluid condit means for connecting the said second port with the other end of each of the said spools so that rotation of the said steering control wheel in the said other direction tends to cause the said spools to shift in a direction away from their one ends and rotation of the said steering control wheel in the said one direction tends to cause the said spools to shift in a direction away from their said other ends, and follow-up means operative to equalize the fluid pressure differential between the said first and second conduit means, the said follow-up means being connected to the said first and second conduit means and responsive to the changing of the steering angle of the dirigible wheel means.

References Cited by the Examiner

UNITED STATES PATENTS

| | | | |
|---|---|---|---|
| 2,583,197 | 1/1952 | Armington | 180—79.2 |
| 2,954,756 | 10/1960 | Donner et al. | 180—79.2 X |
| 3,099,327 | 7/1963 | McAdams | 180—79.2 |

KENNETH H. BETTS, *Primary Examiner.*